US012703167B2

(12) United States Patent
Jiang

(10) Patent No.: US 12,703,167 B2
(45) Date of Patent: Aug. 11, 2026

(54) METHODS FOR MANUFACTURING AN END-LESS PALLET FROM LESS IN WIDTH CHAIN SHEET MATERIAL

(71) Applicant: Intertape Polymer Corp., Sarasota, FL (US)

(72) Inventor: Wenyong Jiang, Guangdong (CN)

( * ) Notice: Subject to any disclaimer, the term of this patent is extended or adjusted under 35 U.S.C. 154(b) by 294 days.

(21) Appl. No.: 18/264,284

(22) PCT Filed: Mar. 25, 2021

(86) PCT No.: PCT/CN2021/082957

§ 371 (c)(1),
(2) Date: Aug. 4, 2023

(87) PCT Pub. No.: WO2022/198556

PCT Pub. Date: Sep. 29, 2022

(65) Prior Publication Data

US 2024/0092049 A1 Mar. 21, 2024

(51) Int. Cl.
*B31D 5/00* (2017.01)
*B65D 71/00* (2006.01)
*B65H 45/101* (2006.01)

(52) U.S. Cl.
CPC ....... *B31D 5/0039* (2013.01); *B65D 71/0096* (2013.01); *B65H 45/1015* (2013.01);
(Continued)

(58) Field of Classification Search
CPC .......... B31D 5/0039; B31D 2205/0035; B65D 71/0096; B65D 85/67; B65H 45/1015;
(Continued)

(56) References Cited

U.S. PATENT DOCUMENTS 6,263,814 B1 * 7/2001 O'Connor .......... B65H 45/1015 112/431
6,673,185 B1 * 1/2004 Beduhn .............. B65H 45/1015 428/57

(Continued)

FOREIGN PATENT DOCUMENTS

DE 10206087 C1 * 7/2003 ......... B65H 45/1015
EP 0896944 A2 * 2/1999 ......... B65H 45/1015

OTHER PUBLICATIONS

Office Action issued to related EP Application No. 21725004.2, dated Nov. 3, 2023, 3 pages.

*Primary Examiner* — Jeremy R Severson
(74) *Attorney, Agent, or Firm* — Jeffrey R. Gray; Moore & Van Allen PLLC

(57) ABSTRACT

A method of manufacturing endless pallet chain sheet material is provided. The method includes: (a) providing a pallet having a longitudinal direction and a lateral direction perpendicular to the longitudinal direction; (b) providing a chain sheet material; (c) positioning the chain sheet material on the pallet to include a first row and a second row, wherein: the first row and the second row are arranged along the lateral direction; the first row is disposed at a layer the same as or below that disposed at by the second row; each of the first row and the second row includes N bundles arranged along the longitudinal direction, wherein N≥2; and each of the N bundles includes an upper portion and a lower portion; and (d) connecting the lower portion of the first bundle of the first row with the upper portion of the N-th bundle of the second row.

18 Claims, 9 Drawing Sheets

(52) U.S. Cl.
CPC ................ *B31D 2205/0035* (2013.01); *B65H 2701/11231* (2013.01); *B65H 2701/18242* (2013.01)

(58) Field of Classification Search
CPC .. B65H 2301/42162; B65H 2701/1824; B65H 2701/18242; B65H 2701/11231
See application file for complete search history.

(56) References Cited

U.S. PATENT DOCUMENTS

| | | | | |
|---|---|---|---|---|
| 6,729,471 | B2 * | 5/2004 | O'Connor ............. | B65D 85/67<br>206/497 |
| 2006/0179614 | A1 * | 8/2006 | Andreasson ....... | B65H 45/1015<br>19/161.1 |

* cited by examiner

METHODS FOR MANUFACTURING AN END-LESS PALLET FROM LESS IN WIDTH CHAIN SHEET MATERIAL

CROSS-REFERENCE TO RELATED APPLICATIONS

The present application is a national stage entry of International Patent Application No. PCT/CN2021/082957 (WO/2022/198556) titled "Methods for Manufacturing an Endless Pallet from less in width Chain Sheet Material" in the name of Nuevopak (Jiangmen) Environmental & Technology Company Limited, with an international filing date of Mar. 25, 2021, the disclosures of which are hereby incorporated by reference in their entirety.

FIELD

The present invention is related to methods for manufacturing endless chain sheet, especially the methods for manufacturing multiple rows of endless chain sheet cushioning material on a pallet.

BACKGROUND

In common practice, the width of a chain of sheet material, which can be formed into a cushioning product, is approx. 70 to 76 cm or 28 to 30 Inch to fit a commonly used EUR pallet with a width of 80 cm. This is the optimal method for stacking rows or bundles of a continuous chain of sheet material with limited unused space for transport and storage having the most possible running meters of a continuous chain of sheet material to directly feed to a cushioning dispenser as from an end-less pallet. The total height of a pallet including rows or stacked bundles of chain sheet material could be up-to 110 cm including the pallet height. This is the optimal method for stacking rows or bundles of a continuous chain sheet material with limited unused space for transport and storage having the most possible running meters of a continuous chain of sheet material to directly feed to a cushioning dispenser as from an end-less pallet.

For chain sheet material with less width, say 15 inches, can be stacked in two rows on the pallet, each of which needs a separate feed-in and position for the cushioning dispenser. However, it takes time to have multiple manual feed-in handlings and to adjust the position of the cushioning dispenser or the end-less pallet.

SUMMARY

In accordance with one aspect of the present invention, a method of manufacturing endless pallet chain sheet material is provided. The method includes steps of: (a) providing a pallet having a longitudinal direction and a lateral direction perpendicular to the longitudinal direction; (b) providing a chain sheet material; (c) positioning the chain sheet material on the pallet to include a first row and a second row, wherein: the first row and the second row are arranged along the lateral direction; the first row is disposed at a layer the same as or below that disposed at by the second row; each of the first row and the second row includes N bundles arranged along the longitudinal direction, wherein N≥2; and each of the N bundles includes an upper portion and a lower portion; and (d) connecting the lower portion of the first bundle of the first row with the upper portion of the N-th bundle of the second row.

In accordance with another aspect of the present invention, a method of manufacturing endless pallet chain sheet material is provided. The method includes steps of: (a) providing a pallet having a longitudinal direction and a lateral direction perpendicular to the longitudinal direction; (b) providing a chain sheet material; (c) positioning the chain sheet material on the pallet to include a first layer and a second layer above the first layer, wherein: each of the first layer and the second layer includes M rows including a first row and a last row, wherein M≥2; each of the M rows includes N bundles arranged along the longitudinal direction; and each of the N bundles includes an upper portion and a lower portion; and (d) connecting the lower portion of the first bundle of the M-th row of the second layer with the upper portion of the N-th bundle of the first row of the first layer.

In accordance with yet another aspect of the present invention, a method of manufacturing endless pallet chain sheet material is provided. The method includes steps of: providing a pallet having a longitudinal direction and a lateral direction perpendicular to the longitudinal direction; providing a chain sheet material; positioning the chain sheet material on the pallet to include a first row and a second row, wherein: the first row and the second row are arranged along the lateral direction; each of the first row and the second row includes a first bundle and a last bundle arranged along the longitudinal direction; and each of the first bundle and the second bundle includes an upper portion and a lower portion; and connecting the lower portion of the first bundle of the first row with the upper portion of the last bundle of the second row.

DETAILED DESCRIPTION

The present invention will now be described more specifically with reference to the following embodiments. It is to be noted that the following descriptions of preferred embodiments of this invention are presented herein for the purposes of illustration and description only; they are not to be exhaustive or to be limited to het precise form disclosed.

Figure 1:
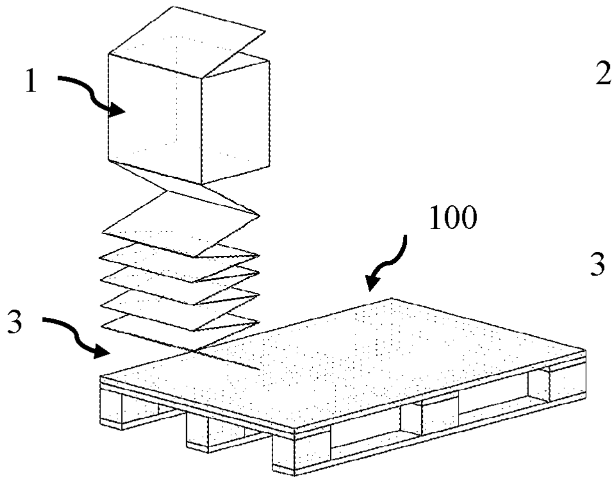
FIG. 1 is a schematic diagram showing a first bundle or row of chain sheet material is positioned on a pallet according to one embodiment of the present invention.
Figure 2:
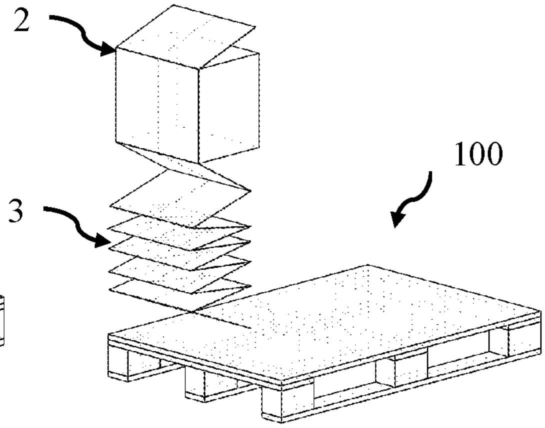
FIG. 2 is a schematic diagram showing a first bundle or row of pre-configured or pre-folded chain sheet material is positioned on a pallet according to one embodiment of the present invention.

Please refer to FIG. 1, which illustrates an embodiment of a first bundle or row of chain sheet material 1 is positioned on a pallet 100 according to the present invention. It is appreciated by the skilled person in the art that a row may be formed of a number of N bundles of chain sheet material, N≥2. FIG. 2 illustrates the similar concept of the embodiment shown in FIG. 1 while the chain sheet material is pre-configured or pre-folded chain sheet material 2. The width of the chain sheet material 1 or the pre-configured or pre-folded chain sheet material 2 is about half of the width of the pallet 100. For example, the width of the chain sheet material 1 or the pre-configured or pre-folded chain sheet material 2 is about 15 inches and that of the pallet 100 is 30 inches.

In FIGS. 1 and 2, the chain sheet material 1 or the pre-configured or pre-folded chain sheet material 2 underneath the first bundle in the first row may be folded into several bottom sheets, namely the lower portion 3 of the first bundle, so as to be connected to the second row in the first layer or making a total height of layers bundles or rows a predetermined height such as 1.1 meter.

Figure 3A:
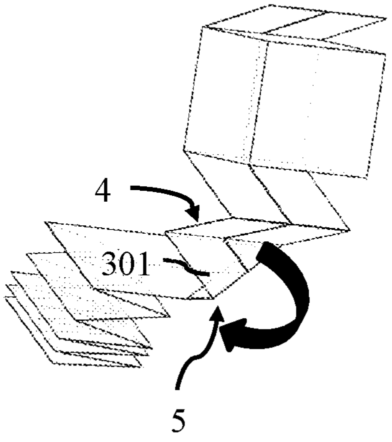
FIGS. 3A-3B are schematic diagrams showing the layer of the chain sheet material near the bottom of the bundle or row to be folded inwards underneath.
Figure 3B:
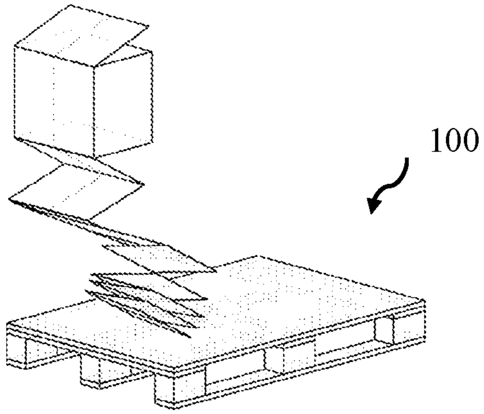
Figure 4:
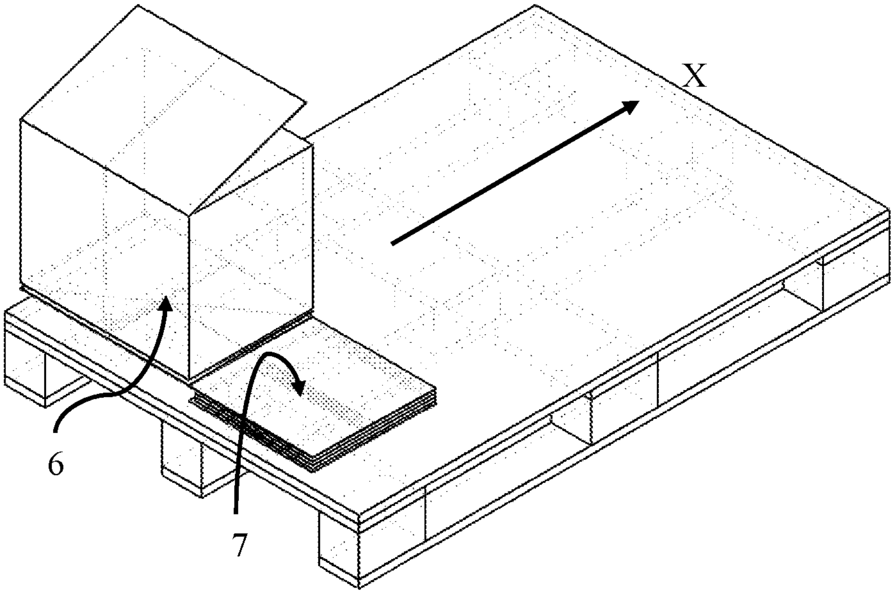
FIG. 4 is a schematic diagram showing the method of positioning the first bundle or row on a pallet and letting the remaining sheets of the chain sheet material positioned aside.

Refer to FIGS. 3A and 3B, illustrating a sheet 5 of the pre-configured or pre-folded chain sheet material 2 near the bottom 4 of the bundle or row to be folded inwards or by an angle underneath in the first bundle or row to be a first folded part 301 of the lower portion 3, so the remaining of the pre-configured or pre-folded chain sheet material 2 may be positioned aside on the pallet 100. In another embodiment, the sheet 5 can be folded outwards. FIG. 4 shows the method of positioning the upper portion 6 of the first bundle in the first row on the pallet 100 and letting the remaining sheets 7 of the pre-configured or pre-folded chain sheet material 2 positioned aside.

Figure 5:
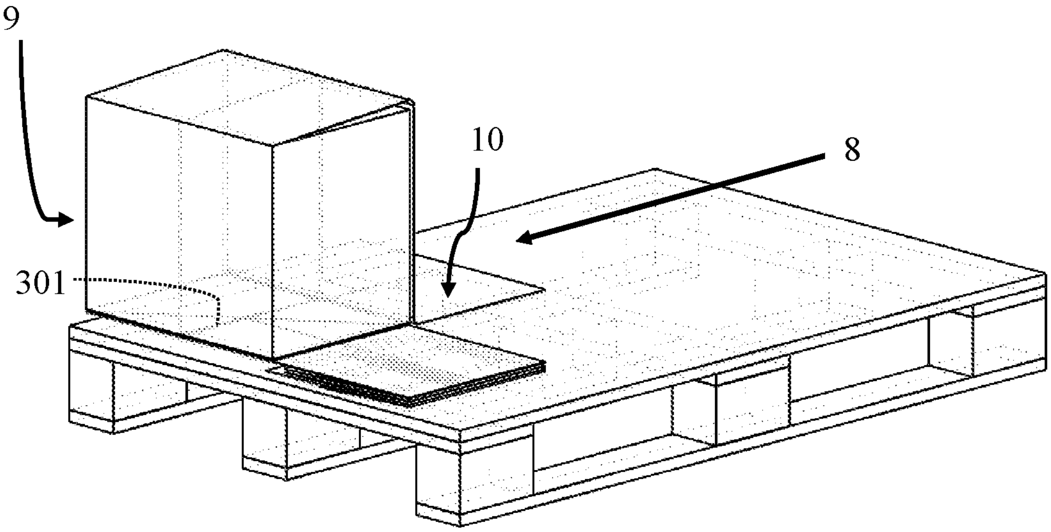
FIG. 5 is a schematic diagram showing the method of positioning the first bundle of the chain sheet material at the first layer long the first row on a pallet.

Refer to FIG. 5, which shows the method of positioning the first bundle 9 of the chain sheet material at the first layer along the first row 8 on the pallet 100, wherein the top sheet 10 of the first bundle 9 may be connected or spliced to the bottom sheet of the next bundle (not shown) of the first row 8, along a longitudinal direction X of the pallet 100 as shown in FIG. 4.

Figure 6:
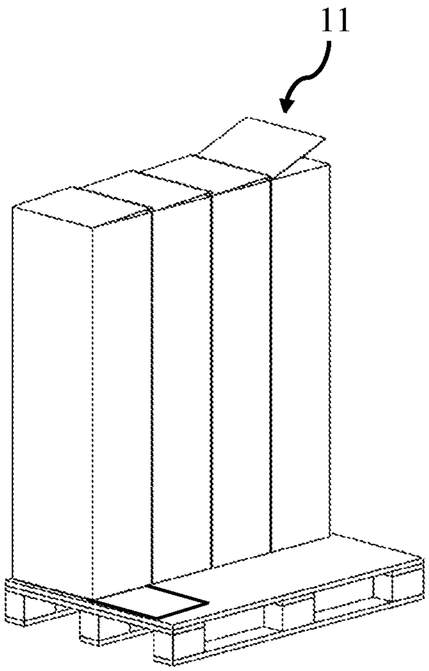
FIG. 6 is a schematic diagram showing the method of positioning tall bundles of the chain sheet material along the first row on a pallet.
Figure 7:
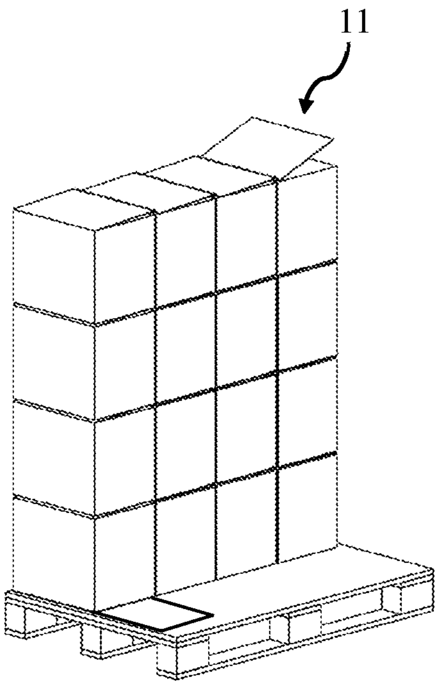
FIGS. 7 and 8 are schematic diagrams showing the method of positioning bundles of the chain sheet material along the rows of different layers on a pallet.

As previously mentioned, the height of sheet material on a pallet may reach about 1.1 meter in total height. Thus, a row of the chain sheet material may be composed of tall bundles, wherein each bundle may reach about 1 meter in height, as shown in FIG. 6. Alternatively, there can be several layers of small bundles of chain sheet material to be piled up to a total height of about 1.1 meter, as shown in FIG. 7. The last and upper sheet 11 of the endless chain of sheet material 1 can be the sheet to be fed into a cushioning dispenser (not shown).

As previously illustrated in FIG. 5, the top sheet of the n-th bundle of a row in FIG. 6 or FIG. 7 may be connected or spliced to the bottom sheet of the (n+1)th bundle by using a single-sided tape or glue or double-sided tape or glue, where n=1, 2, . . . N−1. In addition, for the multiple layer arrangement of the chain sheet material, the separate rows at different layers may also be connected to each other by connecting or splicing the top sheet of the N-th bundle of each layer to the bottom sheet of the first bundle of the next or upper layer by using a single-sided tape or glue or double-sided tape or glue.

In another embodiment, for the multiple layer arrangement of the chain sheet material in FIG. 7, for example L layers, the top sheet of the n-th bundle at the L-th layer may be connected or spliced to the bottom sheet of the (n+1)th bundle at the first layer, where n=1, 2, . . . N−1 and L≥2. In addition, the top sheet of the n-th bundle at the l-th layer may be connected or spliced to the bottom sheet of the n-th bundle at (l+1) the layer, where n=1, 2, . . . N and l=1, 2, . . . L−1.

Figure 8:
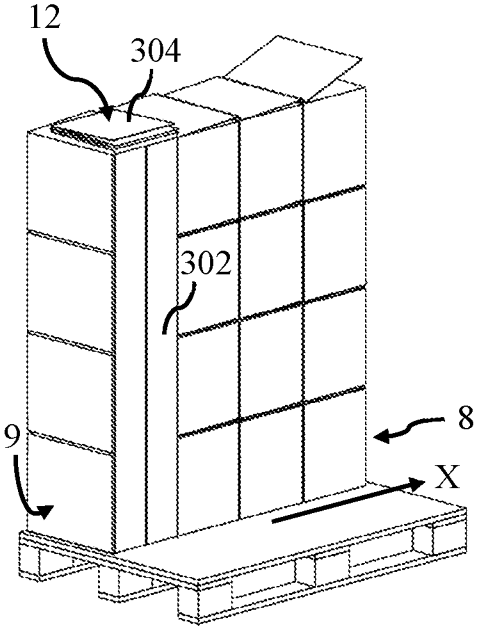
Figure 9:
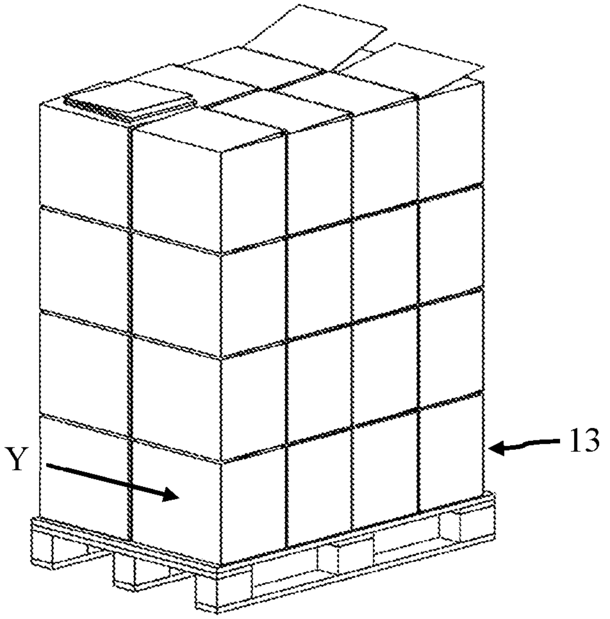
FIG. 9 is a schematic diagram showing the method of positioning bundles of layers of the chain sheet material, each layer includes two rows on a pallet.

FIG. 8 shows the prepared bottom sheet(s) 12 of the first bundle 9 positioned on top to be ready to connect to the second row 13 of bundles when positioned aside as shown on FIG. 9. The additional bundles and layers have been positioned according to the methods described in FIG. 7 after the first bundle 9 of the first layer along the first row 8 as mentioned in FIG. 5 had been positioned. The prepared bottom sheet(s) 12 of the first bundle 9 includes a tail part 304 and a middle part 302 connected between the tail part 304 and the first folded part 301. It is clearly that the middle part 302 of the first bundle 9 should have a length sufficient to put the tail part 304 on top of the first bundle of the first row 8 at the L-th layer, namely, the top layer.

Refer to FIG. 9, which shows an embodiment of positioning bundles of layers of the chain sheet material, the chain sheet material includes two rows placed along the lateral direction Y on the pallet 100. Taking the bottom layer for example, the second row 13 of the bottom layer is positioned aside to the first row of the same layer. In addition, an arrangement direction extending from the first bundle to the N-th bundle of the first row can be the same as or opposite from that extending from the first bundle to the N-th bundle of the second row. Furthermore, if the width of the chain sheet material 1 or the pre-configured or pre-folded chain sheet material 2 is about 10 inches or less, the number of rows in one layer can be 3 or more. The same concept can be applied to more rows in one layer when applicable.

Figure 10A:
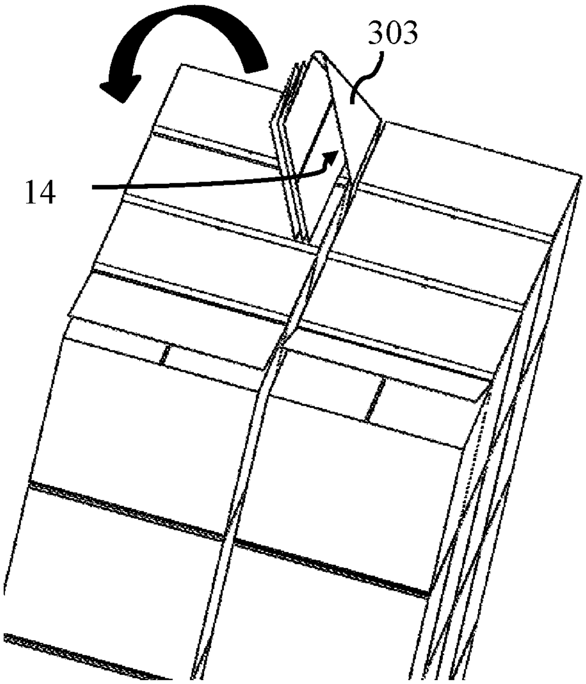
FIGS. 10A-10C are schematic diagrams showing some folding method of the chain sheet material according to some embodiment of the present invention.
Figure 10B:
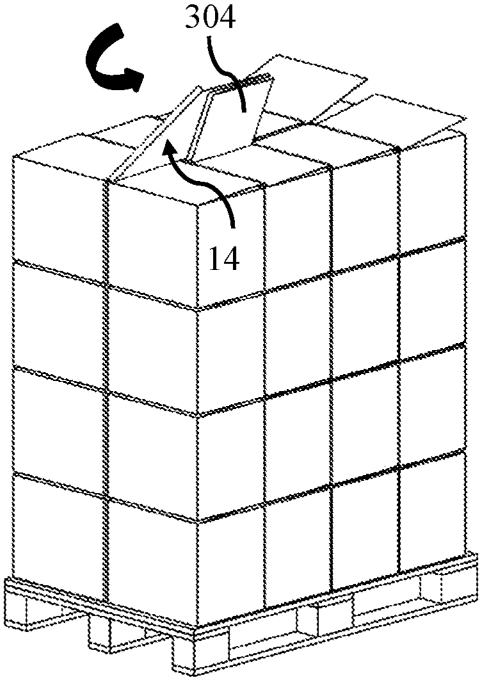
Figure 10C:
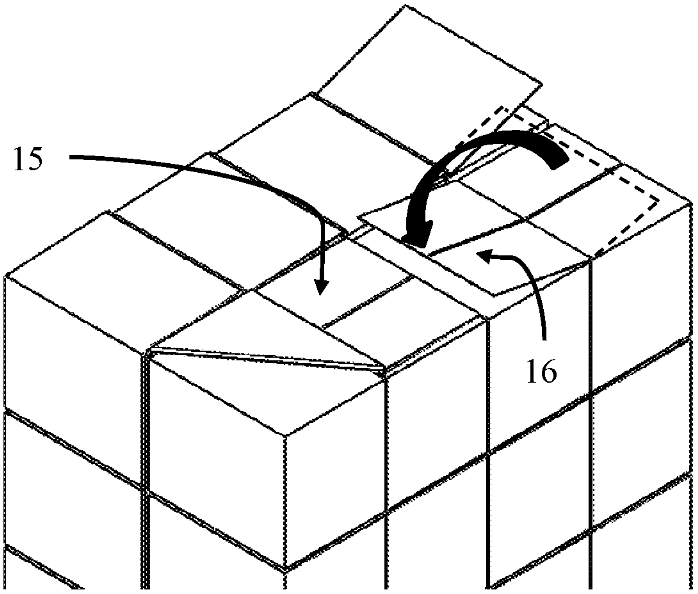

FIGS. 10A to 10C illustrate some folding method of the chain sheet material according to some embodiment of the present invention. In FIGS. 10A and 10B, the bottom sheet 14 of the first row on the left is folded to be connected to the second row on the right, wherein a second folded part 303 is formed between the tail part 304 and the middle part 302. It is also clearly that the middle 302 part of the first bundle 9 should have a length sufficient to put the second folded part 303 on top of the first bundle of the second row 13 at the L-th layer, namely, the top layer. In FIG. 10C, the folded flat position 15 of the folded sheets or layers of the chain sheet material is on top of the second row, and the top sheet 16 of the N-th bundle of the second row 13 is folded back or turned over on top of the second row 13 so as to connect with the tail part 304 of the first bundle 9.

Figure 11:
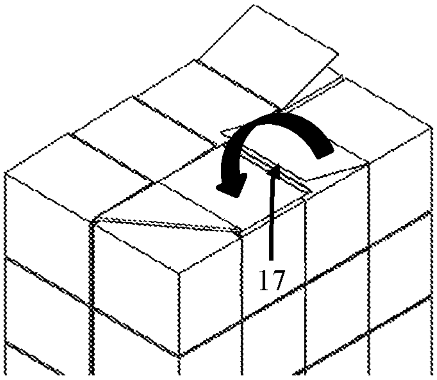
FIG. 11 is a schematic diagram showing connection of the chain sheet material by common splicing.
Figure 12:
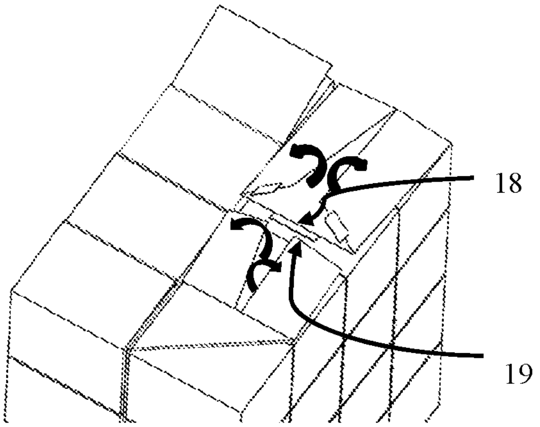
FIG. 12 is a schematic diagram showing connection of a 1-ply pre-configured or pre-folded sheet material by common splicing.
Figure 13A:
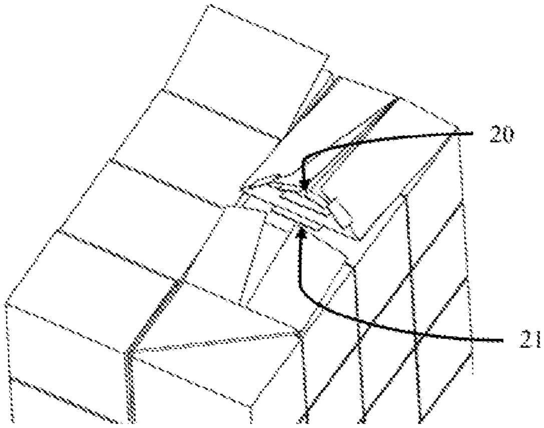
FIGS. 13A and 13B are schematic diagrams showing connection of a 2-ply pre-configured or pre-folded sheet material by common splicing.
Figure 13B:
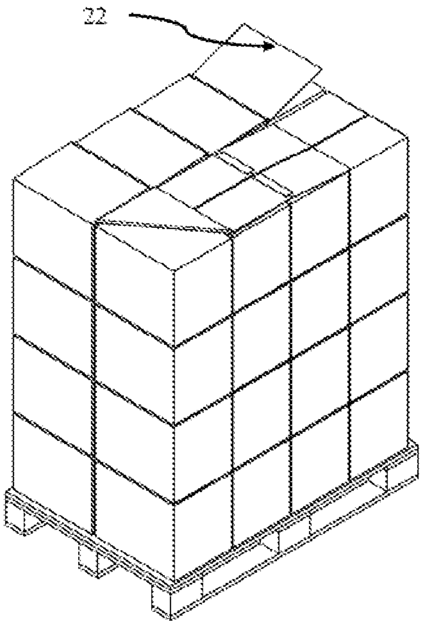

Some practices are applicable to connect or splice the chain sheet material so as to form an endless sheet of the material. FIGS. 11-13 illustrate some exemplary embodiments of connection of the sheet material composed from four layers, and each embodiment includes two rows of four bundles positioned side by side on the pallet. In FIG. 11, a sheet, for example, the bottom sheet, of a tail part of a first bundle 9 from the first row of chain sheet material is configured to be connected to the second row top layer sheet 17. In FIG. 12, a bottom sheet 19 of a first bundle 9 from the first row of a 1-ply pre-configured or pre-folded sheet of chain sheet material is configured to be connected to the second row top layer sheet 18. In FIG. 13, a bottom sheet 21 of a first bundle from the first row of a 2-ply pre-configured or pre-folded sheet of endless chain sheet material is configured to be connected to a second row top layer sheet 20. Where either the 1-ply pre-configured or pre-folded sheet or 2-ply pre-configured or pre-folded sheet of the chain sheet material can be made by pre-processing the chain sheet material before the chain sheet material is positioned on the pallet. Still, only one sheet of the chain sheet material needs to be fed into a cushioning dispenser without a need of a new feed-in, according the abovementioned embodiments. Thus, the present invention provides the maximum running length of an endless chain sheet material on a pallet.

Figure 14A:
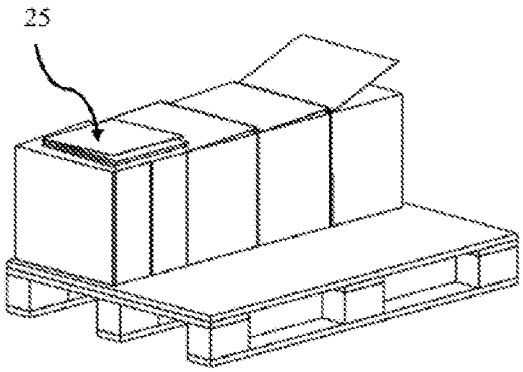
FIGS. 14A-14C are schematic diagrams showing the method of positioning a first layer of two rows of bundles of the chain sheet material on a pallet, according to an embodiment of the present invention.
Figure 14B:
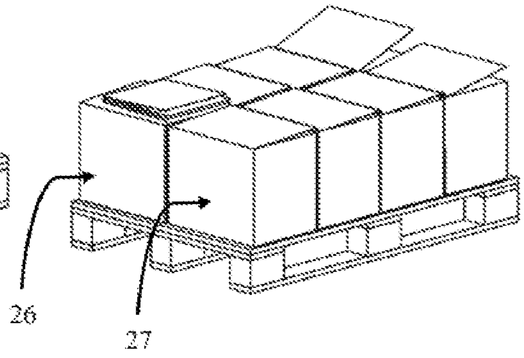

Possibly a too height row or rows composed out of bundles from a less in width end-less chain sheet material may tip during manufacturing, transport or may tip during converting through a cushioning dispenser. The tension on the web of a chain sheet material may cause tear converting a high row, which can be up to 1 meter high. Therefor it may, that a row or rows composed of multiple bundles on an end-less pallet, need to be manufacture out of lower rows. The present invention provides method of positioning bundles of endless material with less in width on a pallet to reduce the chance of tipping or tear of the web. Refer to FIGS. 14A and 14B, which shows the method of positioning a first layer of two rows of bundles of the chain sheet material on a pallet. In one embodiment, the two rows of bundles in the same layer are about the same in height. The bottom sheets 25 of the first bundle of the first row at the first layer are disposed on top of the first bundle. With the similar concept described in the previous sections, the first row and the second row of the chain sheet material are positioned side by side on the pallet 100. The sheet material can be composed from M rows, where M≥2. In FIG. 14B, after the first row 26 of the first layer has been positioned on the pallet 100, the second row 27 of the first layer can be positioned aside of the first row 26, i.e., along the lateral direction Y of the pallet 100. In addition, an arrangement direction extending from the first bundle to the N-th bundle of the first row can be either the same as or opposite from that extending from the first bundle to the N-th bundle of the second row.

Figure 14C:
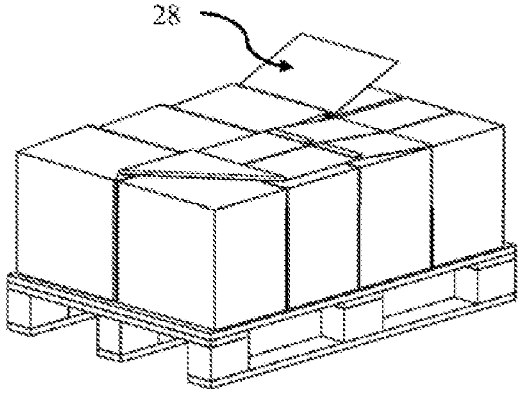

In FIG. 14C, similar methods of connecting or splicing the lower portion of a first row with the upper portion of a second row as shown in FIGS. 10A-10C can be applied for the first row 26 and the second row 27. Likewise, a layer of chain sheet material may include more row if applicable, which renders the whole pallet of chain sheet material more stable.

Figure 15A:
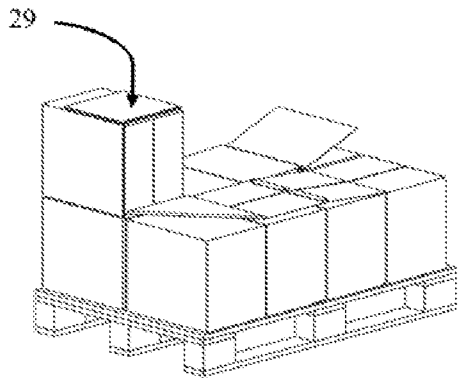
FIGS. 15A-15F are schematic diagrams showing the method of positioning two layers of rows of bundles of the chain sheet material on a pallet, according to some embodiments of the present invention.

Refer to FIGS. 15A-15F, which illustrate some embodiment of positioning two layers of rows of bundles of the chain sheet material on a pallet. In FIG. 15A, a new layer is started to be formed on top of the first layer of two rows, and the bottom sheet 29 of the first bundle of a first row at the second layer is placed on top of the first bundle of the first row at the first layer. In general, if there are M rows, the bottom sheet of the first bundle of the m-th row at the second layer is placed on top of the first bundle of the m-th row at the first layer, wherein m=1, 2, . . . M−1.

Figure 15B:
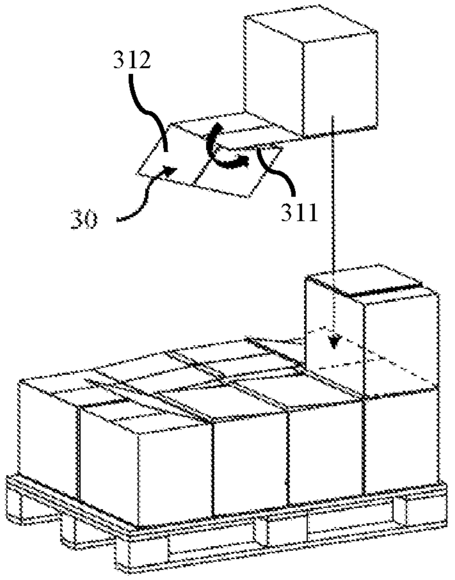
Figure 15C:
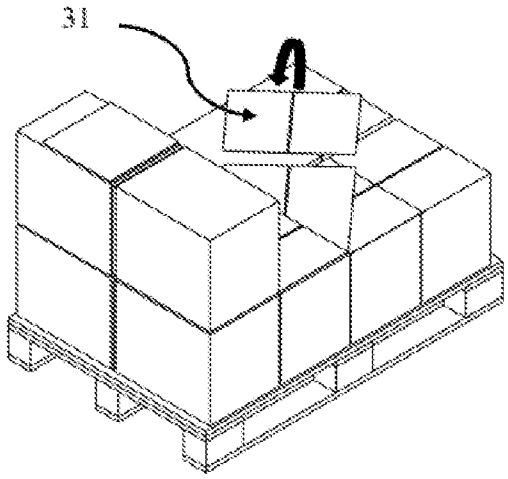
Figure 15D:
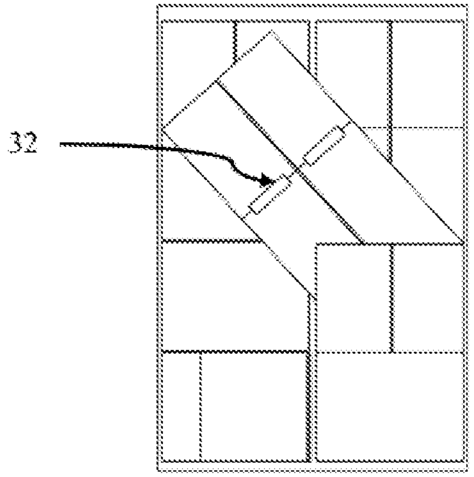

FIG. 15B shows the same pallet of chain sheet material in FIG. 15A from a different perspective, wherein a sheet, for example the bottom sheet, of the lower portion 30 of the first bundle of the second row at the second layer is folded underneath. In general, if there are N bundles in each row, the lower portion of the first bundle of the m-th row of the first layer can be connected with the upper portion of the N-th bundle of the (m+1)th row of the first layer, wherein m=1, 2, . . . M−1. According to one embodiment of the present invention, the lower portion 30 includes a tail part 312 for connecting with the top sheet of the N-th bundle of the first row 26 at the first layer, and a folded part 311 connected between the tail part 301 and the upper portion of the first bundle of the second row at the second layer. A sheet, for example the top sheet, of the upper portion 31 of the N-th bundle of the first row 26 is folded back or turned over on top of the first layer so as to connect with the lower portion 30 of the first bundle of the second row at the second layer by using a tape or glue 32, as illustrated in FIGS. 15C and 15D. In general, if there are M rows and N bundles in each row, the folded lower portion of the first bundle of M-th row at the second layer can be connected or spliced with the folded upper portion of the N-th bundle of the first row on top of the first layer so as to extend the running length of an endless chain sheet material from the first layer to the second layer.

Figure 15E:
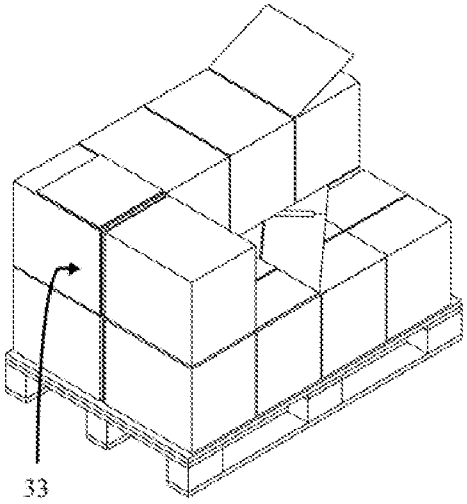
Figure 15F:
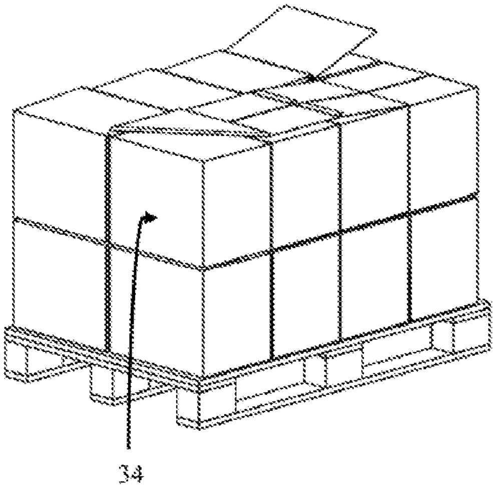

In addition, in FIGS. 15E and 15F, the remaining bundles of the first row 33 of the second layer or the second row 34 of the second layer can then be positioned along the longitudinal direction of the pallet 100, and the first and the second rows 33, 34 of the second layer are about the same in height. An arrangement direction extending from the first bundle to the N-th bundle of the first row can be either the same as or opposite from that extending from the first bundle to the N-th bundle of the second row. Similar methods of connecting or splicing the lower portion of a first row with the upper portion of a second row as shown in FIGS. 10A-10C can be applied for the first row 33 and the second row 34. In general, if there are M rows and N bundles in each row, after finishing the connection between the first layer and the second layer, one can then sequentially connect the upper portion of the n-th bundle of the m-th row with the lower portion of the (n+1)th bundle of the m-th row of the second layer, wherein n=1, 2, . . . N−1 and m=1, 2, . . . M. Furthermore, the lower portion of the first bundle of the m-th row of the second layer can be connected with the upper portion of the N-th bundle of the (m+1)th row of the second layer, wherein m=1, 2, . . . M−1. Certainly, the number of layers can be 3 or more by repeating the connection method described above.

While the invention has been described in terms of what is presently considered to be the most practical and preferred embodiments, it is to be understood that the invention needs not be limited to the disclosed embodiments.

INDUSTRIAL APPLICABILITY

Through the abovementioned embodiments, and endless pallet chain sheet material with a running length being equivalent to that of a 30 inch endless pallet of chain sheet material can be manufactured, and the method of positioning the chain sheet material on the pallet can prevent the material from tipping or tearing on the pallet, which can be a major innovation in the art. In addition, the method of the present invention can supply a full height pallet, such as 1.1 meter high, with the chain sheet material of less width, and there is only one feed-in needed. As a result, the present invention has good industrial applicability.

I claim:

1. A method of manufacturing endless pallet chain sheet material, comprising steps of:

(a) providing a pallet having a longitudinal direction and a lateral direction perpendicular to the longitudinal direction;

(b) providing a chain sheet material;

(c) positioning the chain sheet material on the pallet to include a first row and a second row, wherein:

the first row and the second row are arranged along the lateral direction;

the first row is disposed at a layer the same as or below that disposed at by the second row;

each of the first row and the second row includes N bundles arranged along the longitudinal direction, wherein N≥2;

each of the N bundles includes an upper portion and a lower portion; and (d) connecting the lower portion of a first bundle of the first row with the upper portion of an N-th bundle of the second row;

(e) connecting the upper portion of an n th bundle of the first row with the lower portion of an (n+1)th bundle of the first row, wherein n=1, 2, . . . N−1; and (f) connecting the upper portion of the n th bundle of the second row with the lower portion of an (n+1)th bundle of the second row, wherein n=1, 2, . . . N−1.

2. The method as claimed in claim 1, wherein the lower portion of the first bundle of the first row includes a bottom sheet and the upper portion of the N-th bundle of the second row includes a top sheet.

3. The method as claimed in claim 2, wherein the lower portion of the first bundle of the first row includes:

a tail part including the bottom sheet of the first bundle of the first row and connected with the top sheet of the N-th bundle of the second row;

a first folded part connected with the upper portion of the first bundle of the first row;

a second folded part connected with the tail part; and a middle part connected between the first folded part the second folded part with a length sufficient to put the second folded part on top of the first bundle of the second row.

4. The method as claimed in claim 3, wherein the step (d) further comprising:

(d1) putting the middle part and the tail part of the lower portion of the first bundle of the first row aside of the first folded part before step (e); and (d2) putting the tail part of the lower portion of the first bundle of the first row above the first bundle of the first row before step (f).

5. The method as claimed in claim 3, wherein the step (d) further comprising:

(d3) turning over the top sheet of the N-th bundle of the second row; and (d4) connecting the tail part of the lower portion of the first bundle of the first row with the top sheet of the N-th bundle of the second row on top of and between the first and N-th bundles of the second row.

6. The method as claimed in claim 1, wherein an arrangement direction extending from the first bundle to the N-th bundle of the first row is the same as that extending from the first bundle to the N-th bundle of the second row.

7. The method as claimed in claim 1, further comprising pre-processing the chain sheet material before positioning the chain sheet material on the pallet so that the chain sheet material has 1-ply pre-configured or pre-folded sheets, or 2-ply pre-configured or pre-folded sheets.

8. A method of manufacturing endless pallet chain sheet material, comprising steps of:

(a) providing a pallet having a longitudinal direction and a lateral direction perpendicular to the longitudinal direction;

(b) providing a chain sheet material;

(c) positioning the chain sheet material on the pallet to include a first layer and a second layer above the first layer, wherein:

each of the first layer and the second layer includes M rows including a first row and a last row, wherein M≥2;

each of the M rows includes N bundles arranged along the longitudinal direction; and each of the N bundles includes an upper portion and a lower portion; and (d) connecting the lower portion of a first bundle of the M-th row at the second layer with the upper portion of an N-th bundle of the first row at the first layer.

9. The method as claimed in claim 8, wherein the lower portion of the first bundle of the last row at the second layer includes a bottom sheet and the upper portion of the last bundle of the first row at the first layer includes a top sheet.

10. The method as claimed in claim 9, further comprising step (e) sequentially disposing the first bundles of the M rows at the second layer along the lateral direction before step (d).

11. The method as claimed in claim 10, further comprising (f) sequentially connecting the upper portion of the n-th bundle of the m-th row with the lower portion of the (n+1)th bundle of the m-th row at the second layer after step (d), wherein n=1, 2, . . . N−1 and m=1, 2, . . . M.

12. The method as claimed in claim 11, wherein the lower portion of the first bundle of M-th row at the second layer includes:

a tail part including the bottom sheet of the first bundle of the M-th row at the second layer and connected with the top sheet of the N-th bundle of the first row at the first layer; and a folded part connected between the tail part and the upper portion of the first bundle of the M-th row at the second layer.

13. The method as claimed in claim 12, wherein the step (d) further comprising:

(d1) turning over the top sheet of the N-th bundle of the first row at the first layer; and (d2) connecting the tail part of the lower portion of the first bundle of the M-th row at the second layer with the top sheet of the N-th bundle of the first row at the first layer on top at the first layer.

14. The method as claimed in claim 11, further comprising (g) connecting the lower portion of the first bundle of the m-th row at the second layer with the upper portion of the N-th bundle of the (m+1)th row at the second layer, wherein m=1, 2, . . . M−1.

15. The method as claimed in claim 8, wherein arrangement directions respectively extending from the first bundles to the N-th bundles of the M rows at the first layer and the second layer are the same.

16. A method of manufacturing endless pallet chain sheet material, comprising steps of:

providing a pallet having a longitudinal direction and a lateral direction perpendicular to the longitudinal direction;

providing a chain sheet material;

positioning the chain sheet material on the pallet to include a first row and a second row, wherein:

the first row and the second row are arranged along the lateral direction;

each of the first row and the second row includes a first bundle and a last bundle arranged along the longitudinal direction, wherein the first bundle of the first row and the last bundle of the second row are respectively positioned at an upper layer and a lower right below the upper layer; and each of the first bundle and the last bundle includes an upper portion and a lower portion; and connecting the lower portion of the first bundle of the first row with the upper portion of the last bundle of the second row.

17. The method as claimed in claim 16, wherein the lower portion of the first bundle of the first row and the upper portion of the last bundle of the first row respectively include a bottom sheet and a top sheet.

18. A method of manufacturing endless pallet chain sheet material, comprising steps of:

(a) providing a pallet having a longitudinal direction and a lateral direction perpendicular to the longitudinal direction;

(b) providing a chain sheet material;

(c) positioning the chain sheet material on the pallet to include a first row and a second row, wherein:

the first row and the second row are arranged along the lateral direction;

the first row is disposed at a layer the same as or below that disposed at by the second row;

each of the first row and the second row includes N bundles arranged along the longitudinal direction, wherein $N \geq 2$ and an arrangement direction extending from the first bundle to an N-th bundle of the first row is the same as that extending from the first bundle to an N-th bundle of the second row; and each of the N bundles includes an upper portion and a lower portion; and (d) connecting the lower portion of the first bundle of the first row with the upper portion of the N-th bundle of the second row.

* * * * *